June 24, 1958 — A. RAGONESE — 2,840,781
TESTING DEVICE

Filed April 6, 1955 — 2 Sheets-Sheet 1

Antonio Ragonese
INVENTOR.

BY

United States Patent Office 2,840,781
Patented June 24, 1958

2,840,781

TESTING DEVICE

Antonio Ragonese, Chicago, Ill.

Application April 6, 1955, Serial No. 499,609

1 Claim. (Cl. 324—51)

This invention relates to an electrical testing apparatus especially adapted for testing the standby cable such as are used in passenger coaches of railroad trains, and for use in testing charging wires and other multi-conductor cables.

The primary object of this invention resides in the provision of a testing device which is adapted to be utilized to test the continuity of a multi-conductor cable, cross hookup, poor insulation, and location of breaks in the cable by the provision of low voltage test means including indicator lamps and high voltage testing apparatus for use as an aid in the determination and location of breaks in the cable.

The construction of this invention features the utilization of a casing having suitable receptacles for receiving the terminals or plugs on the ends of the standby conductors of railway passenger coaches or like multi-conductor cables and which further includes switching arrangements for interconnecting the receptacles with low or high voltage sources.

Still further objects and features of this invention resides in the provision of an electrical testing apparatus that is simple in construction, highly efficient in operation, and which is capable of being manufactured at relatively low cost thereby permitting wide use and distribution.

Figure 1:
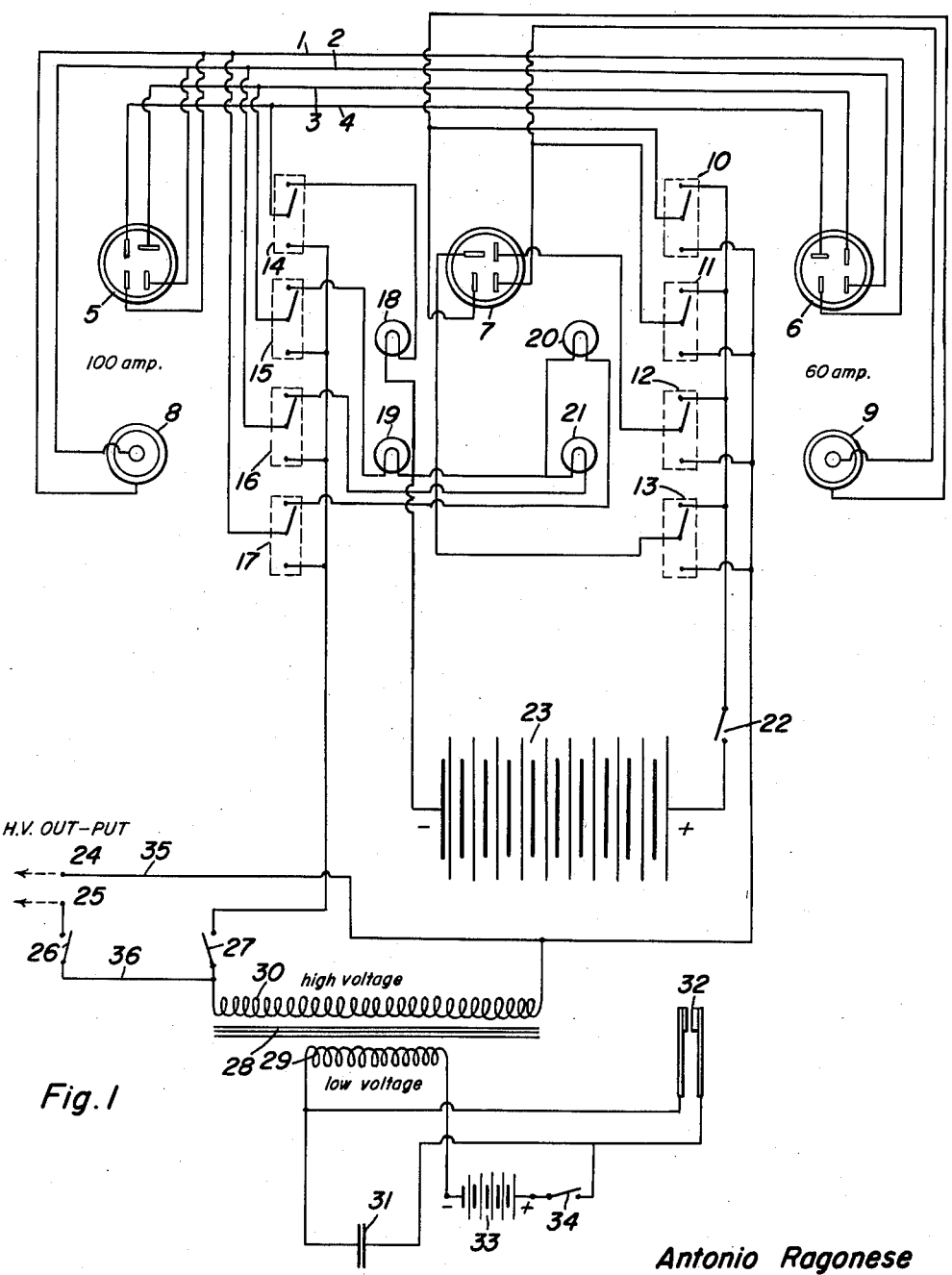
Figure 2:
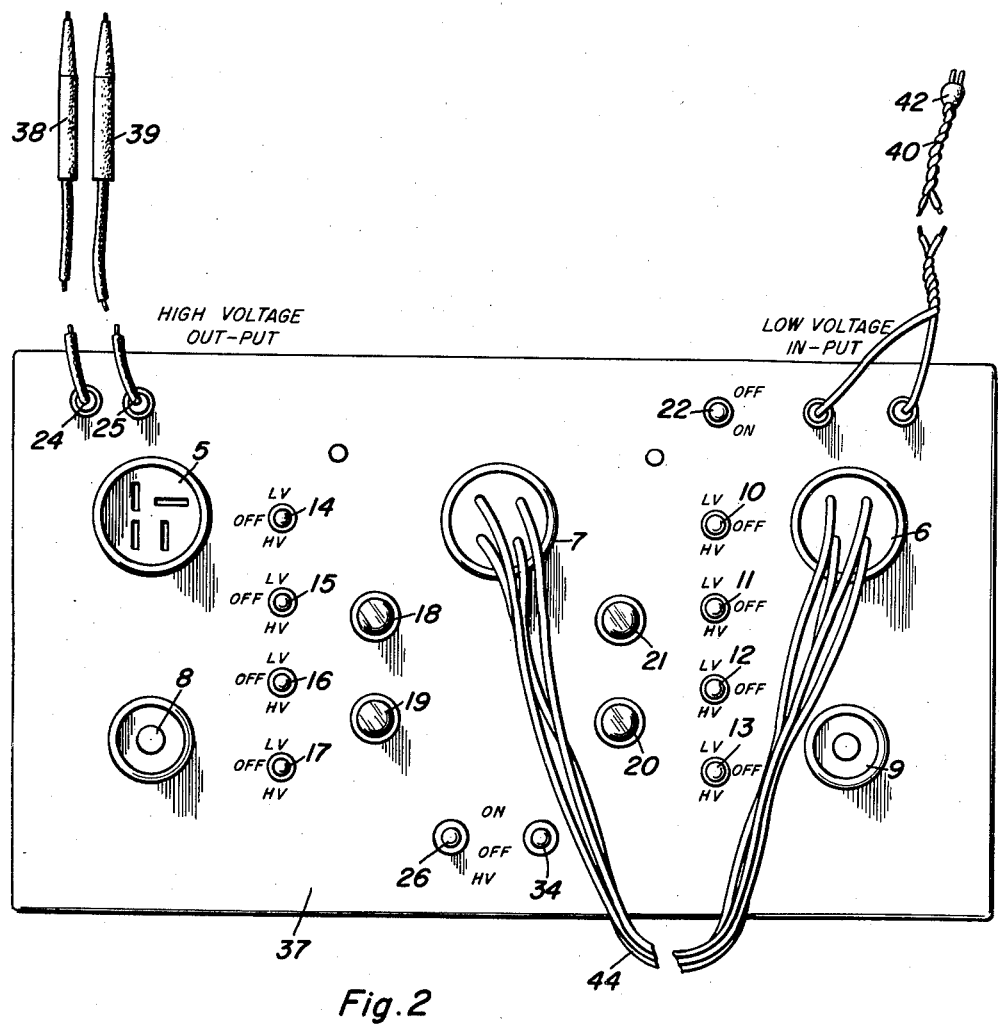

These, together with the various ancillary objects and features of the invention which will become apparent as the following description proceeds, are attained by this electrical testing apparatus, a preferred embodiment of which has been illustrated in the accompanying drawings, by way of example only, wherein:

Figure 1 is a schematic wiring diagram of the electrical testing apparatus comprising the present invention; and Figure 2 is a front elevational view of the indicator board of the electrical testing apparatus.

With continuing reference to the accompanying drawings wherein like reference numerals designate similar parts throughout the various views, and with additional attention directed to the wiring diagram shown in Figure 1, reference numerals 1, 2, 3 and 4 generally designate separate conductors which interconnect the 100 amp plug receptacle 5 and the 60 amp plug receptacle 6 which are provided for receipt of the plugs on the ends of multi-conductor cables such as the standby cables which are four conductor wire cables such as are used in railway passenger coaches. The receptacles 5 and 6 are adapted to receive an end of the standby cable depending upon the capacity of the cable and the other end of the standby cable is adapted to be secured into the plug receptacle 7. In addition, there are provided charging receptacles as indicated at 8 and 9.

The testing apparatus includes a first set of single pole double throw switches which are generally indicated by reference numerals 10, 11, 12 and 13. Each of these switches has three positions, the upper position being a low voltage position, the neutral position being an off position, and the down position being a high voltage position. A second set of single pole double throw switches are provided and are indicated at 14, 15, 16 and 17. These switches control, when in position, the indicator lights 18, 19, 20 and 21.

Connected to the upper contact of the switches 10, 11, 12 and 13 through a switch 22 is a suitable source of low voltage current as indicated at 23 which is also connected through the lamps 18, 19, 20 and 21 to the upper contacts of the switches 14, 15, 16 and 17. Connected across the lower contacts of both the sets of switches 10, 11, 12 and 13 and the set of switches 14, 15, 16 and 17 is the secondary 30 of a transformer 28, the primary coil 29 of which is connected to a suitable battery 33 through a suitable vibrator 32 and condenser 31 which is provided for preventing the vibrator points 32 from excessive burning or pitting. A single pole switch 34 is provided for controlling the circuit of the battery 33.

Connected across the secondary 30 of the transformer 28 are a pair of conductors 35 and 36 forming an output circuit having suitable high voltage output terminals 24 and 25, the high voltage output circuit being controlled by a switch 26. Further, the supply of high voltage to the testing device is controlled by a switch 27.

The testing device is adapted to be mounted on a suitable indicator board 37 and of course suitable test probes 38 and 39 can be connected to the output terminals 24 and 25. A suitable conductor 40 having a plug 42 on the end thereof can be utilized in connecting the testing device to a suitable supply of low voltage as was indicated at 23.

In testing the standby cables such as are used on railway passenger cars and the like, dependent upon the capacity of the standby cable one of the ends thereof is plugged into either the receptacle 5 or 6 while the other end is plugged into the receptacle 7. A suitable standby cable is generally indicated by reference numeral 44. These cables are very long and if a break or short exists in the cable it is generally hard to locate.

In the use of the invention, to check a standby cable it is merely necessary to plug the cable into position. Then, for a low voltage check, switches 14, 15, 16 and 17 may be placed in an upper position and switches 10, 11, 12 and 13 may be operated one at a time. When switch 10 is in an up position, indicator light 20 will light up if continuity is good. If other than indicator light 20 is excited, the plug wires are crossed and the indicator light which is actuated will indicate which wire is hooked up wrong. If no indicator lights are excited it can be assumed that there is a break in the standby cable. A subsequent high voltage check will of course aid in showing where the break exists.

When switch 11 is placed in the up position, light 21 will be excited if continuity is good. If other than light 21 becomes actuated, the wires are crossed.

The receptacle plug prongs that are marked 1, 2, 3 and 4 should light up the indicator lamps 18, 19, 20 and 21 when they are connected in circuit with the low voltage source. In this regard, switch 10, light 20, and conductor 1 form a circuit while switch 11, light 21 and cable wire 2 form a circuit. Likewise, switch 12, light 19 and prongs 3 form a circuit while switch 13, light 18 and prong 4 form a circuit. By operating the switches 10, 11, 12 and 13 the indicator lights will indicate correctly if the wires of the standby cable are hooked up correctly.

If the standby cable does not pass a low voltage test, a high voltage test may then be made. For high voltage test, switches 14, 15, 16 and 17 are placed in the down position. The purpose of these switches is to bypass the indicator lights 18, 19, 20 and 21 which may be burned out by the high voltage.

When test switch 10 is placed in a down position high voltage will be applied to wire No. 1 of the cable to be tested and if this wire has a break the position will show up through heat at the break causing deterioration of any insulations resulting from arcing or the like. Subsequent testing of the other wires of the cable can be obtained. Only one of the switches 10, 11, 12 and 13 can be used at one time so as to maintain the current at a maximum.

In testing a two conductor charging cable used in railway yards to charge the batteries of passenger cars the plugs thereof may be plugged into the receptacles 8 and 9. For a low voltage test, switches 14 and 15 may be placed in the up position and upon operation of switches 10 and 11, indicator lights 20 and 21 may be utilized to show whether the wires are properly connected and the position thereof otherwise. For high voltage checks, switches 14 and 15 may be placed in a down position with switch 10 in a down position and high current will flow through the positive wire. If there is a short or open positive such will show up. Switch No. 11 will control high voltage throw through the negative wire.

In testing field coils by high voltage test, the coils may be connected to the terminals 24 or 25 or the test probes 38 and 39 may be applied on the terminals of the field coil. If the coil has poor insulation or it is open then this will be definitely indicated by sparking and in the other obvious manners. Switch 22 can be used as terminals for low voltage tests of coils and armatures.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A testing device for locating defects in multiconductor cable comprising at least two receptacles for receiving the ends of the cable to be tested, a source of low voltage electrical power, another source of low voltage electrical power, transformer means connected to said another low voltage source for providing a high voltage output, switch means for interconnecting said transformer means to said low voltage source, a first set of switches selectively connecting said high voltage output or said first source of low voltage electrical power to said receptacles, a set of indicator lamps, a second set of switches for selectively connecting said indicator lamps to said first low voltage source and said receptacles, and shunt means connected between said first set of switches and said high voltage output for selectively bypassing said indicator lamps.

References Cited in the file of this patent

UNITED STATES PATENTS

| | | |
|---|---|---|
| 2,628,999 | Bruyne | Feb. 17, 1953 |
| 2,707,267 | Gavin | Apr. 26, 1955 |